Figure 1:
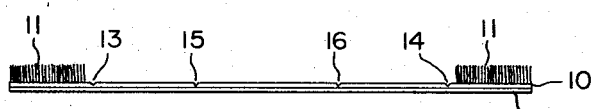

Dec. 26, 1967        K. Q. KONDOLF        3,359,686

WINDOW GLASS CHANNEL

Filed June 11, 1965

*INVENTOR.*
KARL Q. KONDOLF

BY

*Cumpston + Shaw*

ATTORNEYS

United States Patent Office 3,359,686
Patented Dec. 26, 1967

3,359,686
WINDOW GLASS CHANNEL
Karl Q. Kondolf, Penfield, N.Y., assignor to The Schlegel Manufacturing Company, Rochester, N.Y., a corporation of New York
Filed June 11, 1965, Ser. No. 463,219
5 Claims. (Cl. 49—441)

This invention relates to an improved window glass channel, and more particularly, to an improved window glass channel in which a movable window glass is guided, supported, and sealed.

It is known in the prior art to dispose pile rows within the channel in which a movable window glass is moved such as in the window frame surrounding a motor vehicle window. Such glass channels or guides have been expensive to make and install, have been relatively short-lived, and have not provided an adequate seal between the window frame and the window glass.

An object of the invention is to make a window glass channel that is economical, long-lived, and that functions well in providing a good seal between the window frame and the window glass and good support for the glass in any position.

Another object of the invention is to provide a window glass channel which resiliently urges a glass-engaging pile into contact with a window glass and maintains such resilience for a relatively long life.

Other objects of the invention will be apparent hereinafter from the specification and from the recital of the appended claims. To these and other ends, the invention resides in certain improvements all as will be hereinafter more fully described, the novel features being pointed out in the claims at the end of this specification.

In the drawings:

FIG. 1 shows an end elevation of a strip from which a preferred embodiment of the inventive channel is formed; and FIGS. 2-5 each show a cross section view of an embodiment of the window glass channel according to the invention.

Generally, the inventive window glass channel is formed of a strip of material on which a pile is formed along at least one marginal edge. A plastic material is then laminated to the back of such strip to make it spring-like or resilient and self-sustaining in shape, and then the strip is formed into a generally U-shaped channel with the marginal edge bearing the pile being bent back into the channel so that the pile extends outward from such marginal edge to engage a window glass arranged to move within the channel. The pile is thus resiliently urged against the glass by the plastic-backed strip to which the pile is secured, and such resilience assures a good seal between the window frame to which the strip is secured and the window glass. By proper selection of materials, the inventive window glass channel can be made long-lived, resistant to moisture, insects, chemicals, etc., and the resilience of the strip can be maintained throughout a relatively long life.

FIG. 1 shows a cross section of a preferred form of strip from which the inventive window glass channel is made. Generally, a strip of material 10 is provided with pile 11 along one or both of its marginal edges, and a lamina 12 of synthetic thermoplastic resin is secured to the back of strip 10.

Strip 10 is preferably formed as a woven fabric material, and pile 11 is preferably woven into one or both of the marginal portions of strip 10, but pile 11 can also be tufted or sewed to the edge of strip 10 or secured thereto as by fusion, adhesive, flocking, etc. Preferably, fabric 10 and pile 11 are each formed of fibers or strands of polypropylene which is preferred for its economy, resilience, flex life, and resistance to moisture, chemicals, insects, etc. After pile 11 is formed on strip 10, the back of strip 10 is provided with a lamina of synthetic thermoplastic resin 12 which preferably includes polypropylene. Plastic lamina 12 can be applied in the form of a fluid coating on the back of strip 10, or can be a separately formed element or sheet of plastic material fused or otherwise secured to the back of strip 10. Coating or fusion of lamina 12 to strip 10 is preferred so that lamina 12 fills the interstices in fabric 10 as well as overlying the back of strip 10. Lamina 12 is preferably thick enough and of a suitable material such that it makes strip 10 spring-like and self-supporting in a desired shape and yet resilient and flexible.

After strip 10 is backed with plastic layer 12, it is preferably scored for forming into the desired channel shape, and for such purpose, score lines such as lines 13–16 are made. The strip is then heated and passed through forming rollers which bend and form it into the desired shape. Scoring, heating, and forming can be a continuous operation so that the completed strip is made relatively economically.

Strip 10 is preferably formed into one of the embodiments illustrated in FIGS. 2–5 depending upon the particular window application it is intended for, and other considerations such as quality and price. Each of these configurations is generally U-shaped in cross section and has at least one leg of the U bent back into the channel for engaging a window glass disposed in the channel.

Figure 2:
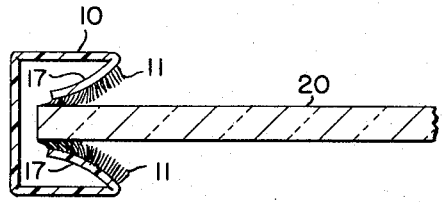

Referring to FIG. 2, strip 10 is bent into a generally U shape, and its marginal edge portions 17 which carry pile 11 are bent back upon themselves to extend into the channel with the pile 11 extending from marginal edge 17 toward glass 20 which is disposed for movement within the channel.

Legs or edge portions 17, because of the resilience of plastic coated strip 10, are biased inward toward each other and into engagement with glass 20. The resilience of leg 17 urges pile 11 into close engagement with glass 20 regardless of variations in the position of glass 20 and effects a seal between the window frame in which strip 10 is mounted and window glass 20.

Because of the excellent flex life of the preferred polypropylene, legs 17 can be bent in and out repeatedly by movement of window glass 20 within the channel without diminishing the resilience of leg portions 17.

Figure 3:
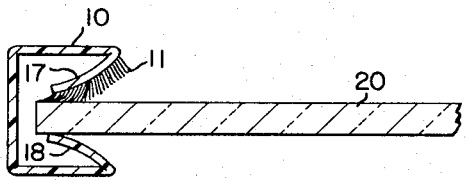

The embodiment of FIG. 3 is similar to the above-described embodiment of FIG. 2 except that no pile is provided on leg portion 18. The preferred polypropylene fabric and backing is sufficiently unctuous or self-lubricating so that glass 20 slides freely relative to leg 18, and leg 18 provides a more positive seal with glass 20 than pile 11. The embodiment of FIG. 3 is preferred for situations in which the weight of glass 20 rests partially downward on leg 18. In the past, in such situations, prior art window guides have worn quickly under the weight of glass 20 and have allowed glass 20 to rattle, leak, etc. The resilience of leg 18 is sufficient to support glass 20 and maintain a seal therewith as well as to keep glass 20 in engagement with pile 11 on leg 17. Also, glass 20 does not wear leg 18 so as to impair the seal therewith, or allow the glass to rattle in its frame.

Figure 4:
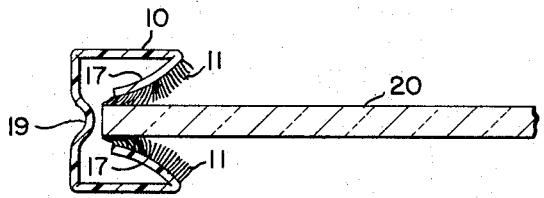

The embodiment of FIG. 4 is the same as the embodiment of FIG. 2 except for the inward curvature 19 in the base portion of the U-shaped channel. Curvature 19 can extend throughout the length of strip 10 as illustrated, or can be formed as a series of recesses spaced along the length of strip 10. Recess or inwardly curved portion 19 allows the inventive strip 10 to fit around obstructions in window frames and makes the strip 10 cooperate with window frame configuration for more economical and secure fastening of strip 10 within a window frame.

Figure 5:
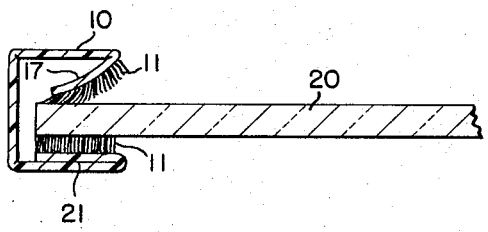

The embodiment of FIG. 5 differs from the embodiment of FIG. 2 in that leg portion 21 is bent back hard against itself so as not to extend resiliently into the open channel. Alternatively, pile 11 can be secured to the inner face of strip 10 along one side thereof, and leg 21 can be eliminated.

The inventive window glass channel can be conveniently configured to snap-fit in place within a window frame, and its self-supporting and resilient characteristics lend themselves to such a snap-fit. For snap-fitting, the inventive channel can be easily configured to provide projections, recesses, and the like cooperating with complementary parts arranged within a window frame. By such an arrangement, screws, fastening clips, staples, etc. which have been used to secure prior art window guides in place can be eliminated, and installation costs can be reduced. Of course, it is also possible to use metal fastening clips, screws, or other devices for securing the inventive strip in place. In addition, strip 10, because of its formation from synthetic thermoplastic, can be fused in place within a window frame. Fitting of strip 10 into window frames can be accomplished by snapping or sliding strip 10 into a generally open channel, or by punching out the bottom corner or bottom of the U-shaped portion of strip 10 and snap-fitting it over bosses or projections disposed within a window frame.

Thus, the inventive window glass channel eliminates steel, rubber, and other multiple-part assemblies that previously were adhered or mechanically secured together, and provides a relatively simple, economically made and easy-to-install window glass channel. Furthermore channels according to the invention have superior resilience, long flex life, and withstand wear better than prior art structures so as to function better in addition to being more economical.

While the invention has been disclosed herein by reference to the details of a preferred embodiment, it is to be understood that such disclosure is intended in an illustrative, rather than a limiting, sense, and it is contemplated that various modifications will readily occur to those skilled in the art, within the spirit of the invention and the scope of the appended claims.

I claim:

1. A window glass guide comprising:
   (a) a relatively long and narrow woven fabric backing strip;
   (b) a pile row woven into said fabric strip along at least one marginal edge thereof, said pile row extending from a first face of said fabric strip;
   (c) a resilient lamina comprising polypropylene fused to a second face of said fabric strip opposite said first face, said lamina filling the interstices of said fabric strip and being thick enough to make said strip self supporting and resilient;
   (d) said strip being formed into a U-shaped cross section to provide a relatively long channel for said window glass; and
   (e) said pile-bearing marginal edge portion of said strip being bent into said channel at an acute angle to the adjacent side wall of said channel and resiliently disposed in said channel with said pile extending toward the opposite side of said channel and adapted for engaging a window glass.

2. The window glass guide of claim 1 wherein said fabric strip and said pile each comprise polypropylene.

3. The window glass guide of claim 1 wherein each marginal edge of said strip is bent into said channel at an acute angle with the respectively adjacent side wall of said channel and resiliently disposed in said channel to confront the respective opposite marginal edge of said strip for engaging a window glass.

4. The window glass guide of claim 3 wherein each of said marginal edges of said strip is provided with one of said pile rows.

5. The window glass guide of claim 4 wherein said fabric strip and said pile each comprises polypropylene.

References Cited

UNITED STATES PATENTS

| | | | |
|---|---|---|---|
| 2,994,929 | 8/1961 | Kessler | 161—67 X |
| 3,018,525 | 1/1962 | Deisenroth | 49—441 |
| 3,131,439 | 5/1964 | Wilfert | 49—440 X |
| 3,258,876 | 7/1966 | Deisenroth et al. | 49—441 |

DAVID J. WILLIAMOWSKY, *Primary Examiner.*

HARRISON R. MOSELEY, *Examiner.*

J. K. BELL, *Assistant Examiner.*